March 4, 1930.  W. LAVERY  1,749,638
DEVICE TO PREVENT RETROGRADE MOVEMENT
Filed Dec. 20, 1928  2 Sheets-Sheet 1
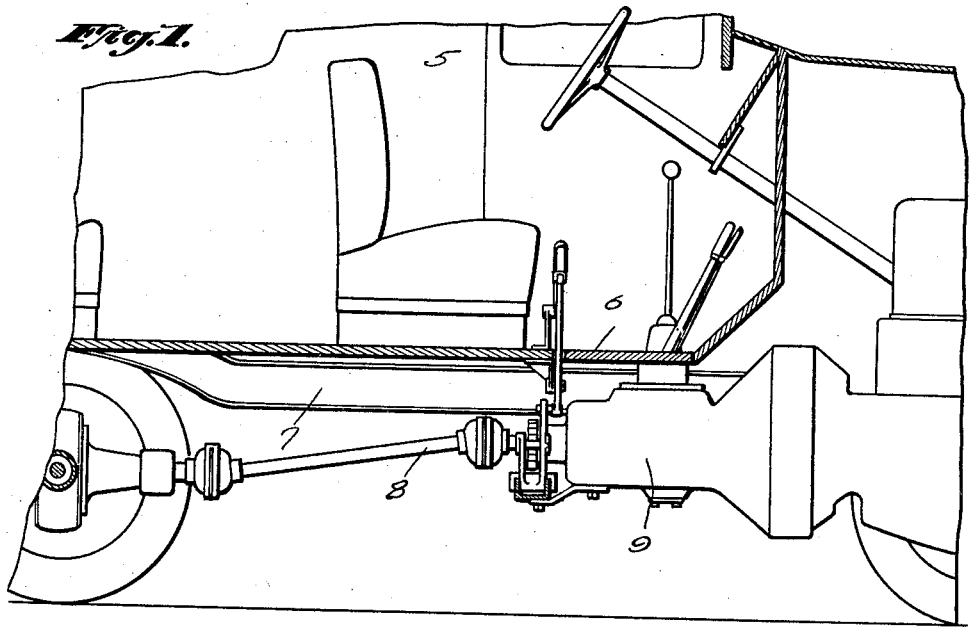
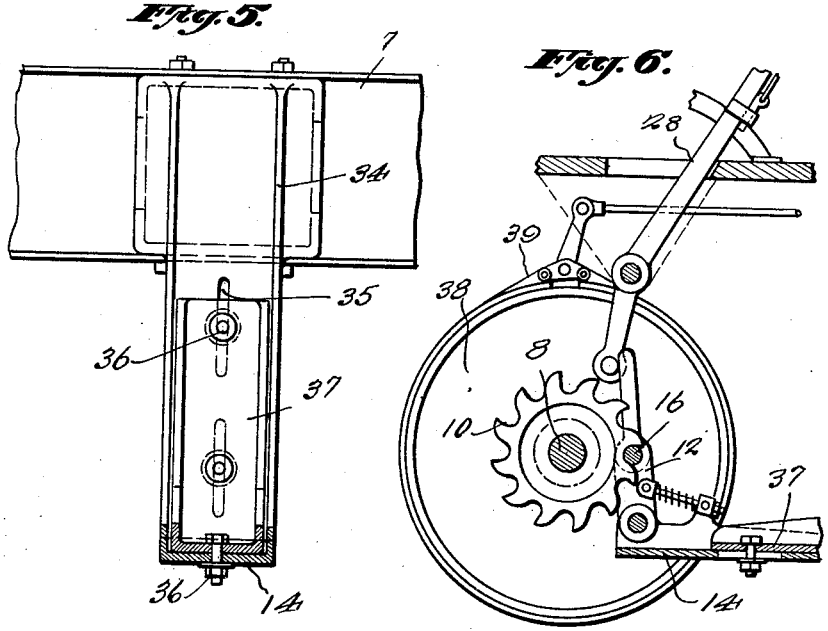
Inventor
WILLIAM LAVERY
By his Attorney March 4, 1930. W. LAVERY 1,749,638
DEVICE TO PREVENT RETROGRADE MOVEMENT
Filed Dec. 20, 1928 2 Sheets-Sheet 2
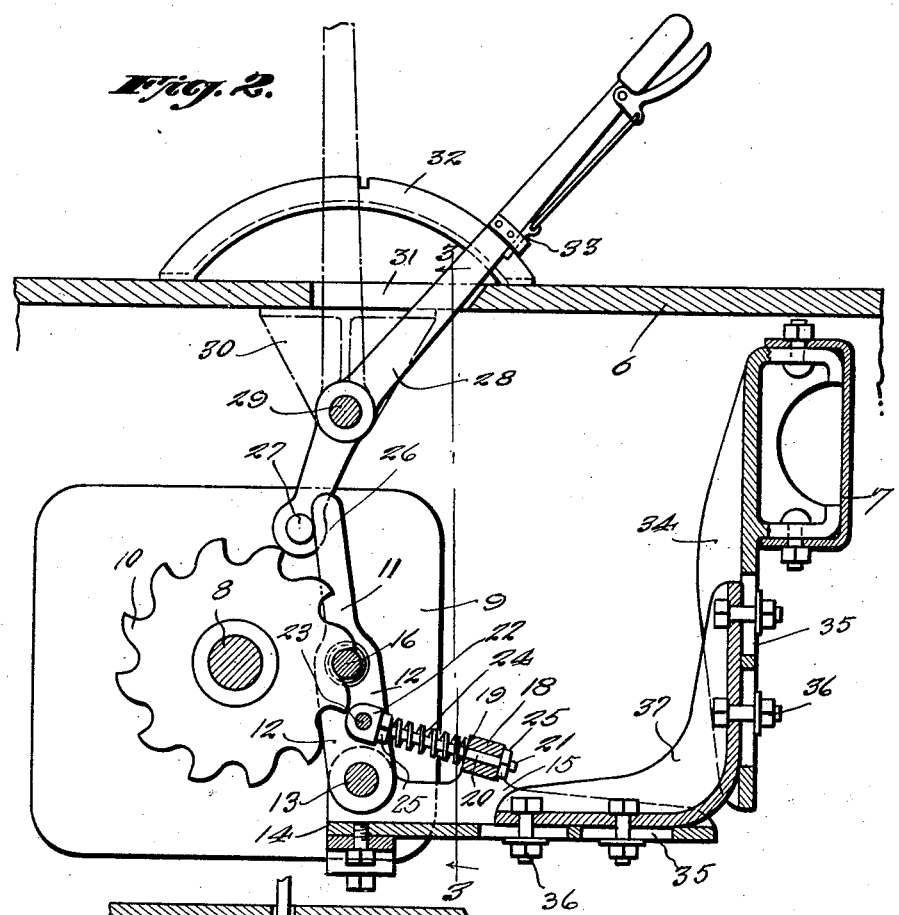
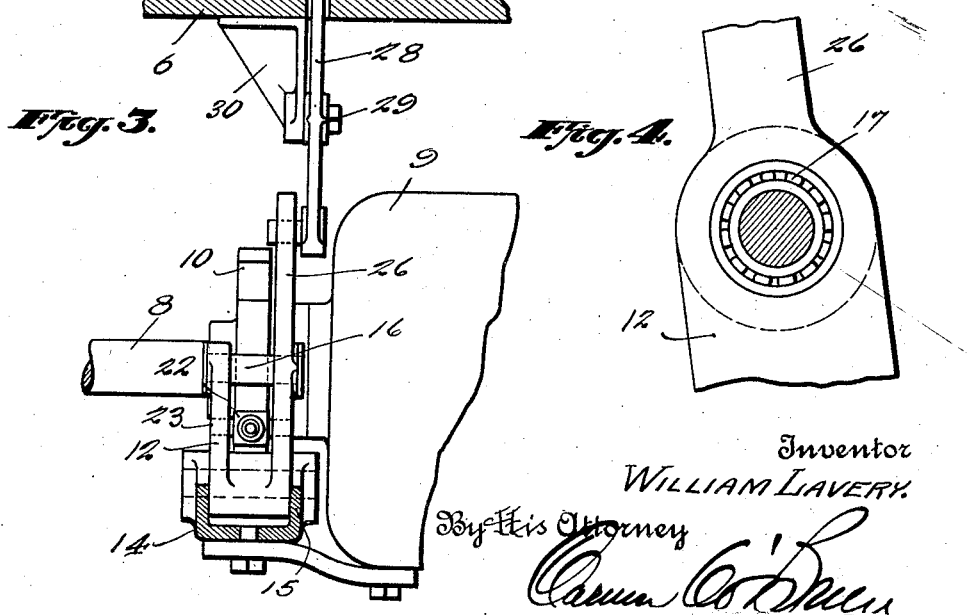
Inventor
WILLIAM LAVERY
By his Attorney Patented Mar. 4, 1930

1,749,638

UNITED STATES PATENT OFFICE

WILLIAM LAVERY, OF BLOOMFIELD, NEW JERSEY

DEVICE TO PREVENT RETROGRADE MOVEMENT

Application filed December 20, 1928. Serial No. 327,317.

The present invention relates to an apparatus to prevent retrograde movement and is designed particularly for use upon automobiles or similar motor driven vehicles for preventing rearward movement of the vehicle should the same become stalled while proceeding upgrade.

The invention has for its principal object to provide an auxiliary brake element adapted to prevent the vehicle from drifting rearwardly, should the same become stalled but which permits of a forward movement of the vehicle at all times.

The invention includes the provision of a positive locking device for the propeller shaft of the vehicle which is entirely independent of the usual service or emergency brakes thereof and which is operable to secure the vehicle against rearward drifting movement while permitting the use of the hand and feet of the driver to operate the vehicle in a forward direction.

A further important object of the invention is to provide an apparatus of this character which may be easily and quickly installed in operative position upon the vehicle without necessitating any material changes or alterations in the construction thereof and which embodies a pawl and ratchet construction in which the pawl is adjustably secured to the frame of the vehicle, in both a horizontal and vertical position whereby to adapt the device for use upon practically all makes of motor driven vehicles.

A still further important object of the invention is to provide an apparatus of this character which may be embodied as a part of the brake drum construction for the propeller shaft of the vehicle, when the same is equipped with a brake mechanism of this character.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a fragmentary longitudinal sectional view through a motor driven vehicle illustrating one form of the invention in operative position with respect thereto, Figure 2 is a transverse sectional view therethrough with the pawl supporting bracket shown in section for illustrating the vertical and horizontal adjusting means therefor, Figure 3 is a sectional view taken substantially along a line 3—3 of Figure 2, Figure 4 is a fragmentary detail, with parts shown in section of the ball bearing mounting for the ratchet engaging pin of the pawl, Figure 5 is a detail, shown in elevation, of the frame attaching bracket for the pawl, and Figure 6 is a fragmentary transverse sectional view illustrating the manner of operatively mounting the device in operative association with a propeller shaft brake drum.

Referring now to the drawings in detail, wherein for the purpose of illustration I have disclosed a preferred embodiment of the invention, the numeral 5 illustrates generally the body of a motor driven vehicle having the usual floor 6 supported upon the usual vehicle frame member 7.

The vehicle is provided with the usual propeller shaft 8 extending through the transmission housing 9 for driving the vehicle in a manner well known in the art. In the form of the invention illustrated in Figures 1 to 3 inclusive, the propeller shaft is provided with a ratchet wheel 10, suitably keyed thereto for rotation with said shaft and with which ratchet wheel is operatively associated a pawl indicated generally at 11 adapted to engage the teeth of the ratchet wheel for securing the same against movement in one direction, namely in a reverse direction when the mechanism of the vehicle is arranged for driving the same forwardly.

The pawl is constructed of a U-shaped member 12 extended upwardly and pivotally supported at its lower end upon a pin 13 carried by a horizontally disposed bracket section 14. One end of the bracket section 14 is secured in a stationary position by a plate 15 attached to the under side of the transmission housing 9. A ratchet engaging pin 16 extends transversely between the parallel arms of the U-shaped member 12 and has its opposite ends journaled for rotation in ball bearing assemblies 17 carried by the respective arms of said U-shaped member.

The horizontal bracket section 14 is provided with a pair of spaced parallel lugs between which a block 19 is positioned and having trunnions 20 extending from opposite sides thereof forming a pivotal mounting for said block between said lugs. A bolt 21 has one end slidably inserted in said block with its opposite end secured in a block 22 also having trunnions 23 extending from opposite sides thereof for pivotally supporting said block between the parallel arms of the U-shaped member 12.

An expansion spring 24 is mounted on the bolt and interposed between the blocks 19 and 22 whereby to normally urge the U-shaped member 12 in a direction toward the ratchet wheel for the engagement of the pin 16 thereof. Lock nuts 25 are threaded at each end of the bolt for adjusting the ends thereof with respect to the blocks 19 and 22.

One end of the U-shaped member 12 is provided with an extension 26 adapted for engagement at its sides opposite from the bolt 21 by a pin 27 projecting laterally from the lower end of a lever 28. The lever is pivotally mounted intermediate its ends upon a suitable pin and support 29 and 30 respectively secured to the under side of the floor 6 and extends upwardly through a slotted opening 31 formed in the floor.

The lever is pivoted for movement transversely with respect to the vehicle and has a quadrant 32 associated therewith by means of which the lever may be secured in its respective positions by means of a conventional latch member 33. It will be apparent from an inspection of Figure 2 of the drawings that through the operation of the lever, the pawl 11 may be moved out of engagement with respect to the ratchet wheel 10 whereas the spring 24 carried on the bolt 21 yieldably urges the pawl into engaged position.

The lever is mounted in a convenient position for operation by the driver of the vehicle and may be moved in a direction for releasing the pawl whereby to permit the pawl to be moved into engagement with the ratchet wheel should the car become stalled while proceeding upgrade and the operator desires to secure the car against retrograde movement without employing the use of the usual service or emergency brake mechanism.

By securing the vehicle against movement in the manner indicated the driver may employ both hands and feet for again starting the engine of the car and driving the same forwardly without the necessity of releasing the auxiliary brake lever 28, it being apparent that the ratchet wheel will freely ride over the pin 16 of the pawl during the forward movement of the car.

A vertically disposed bracket member 34 is bolted to the frame 7 of the vehicle and depends downwardly therefrom with its lower end terminating in a position adjacent the horizontal end of the member 14 remote from the pawl.

The bracket members 14 and 34 are each provided with slotted openings 35 through which bolts 36 are adjustably inserted whereby to attach an intermediate bracket member 37 to the horizontal and vertical bracket members. By reason of this construction it will be apparent that the pawl and associated parts may be adjusted both vertically and horizontally for proper positioning with respect to the ratchet wheel 10.

In the form of the invention illustrated in Figure 6 of the drawing, the propeller shaft 8 of the vehicle is shown provided with a brake drum 38 with which a brake band 39 is operatively associated. As a convenient method of mounting the subject matter of the present invention in relation to said brake mechanism, the ratchet wheel 10 is shown secured to one face of the brake drum with the shaft axially disposed with respect thereto, the supporting bracket for the pawl being attached to the transmission housing in the manner as heretofore explained.

It is obvious that my invention is susceptible to various changes and modifications in construction without departing from the spirit of the invention or the scope of the appended claim, and I accordingly claim all such forms of the device to which I am entitled.

Having thus described my invention, what I claim as new is:

A device of the class described comprising in combination, a vehicle propeller shaft, a ratchet wheel attached thereto, a pawl for said ratchet wheel, spring means normally urging the same into engaged position, a lever operable for moving the pawl out of engagement and an adjustable support for said pawl, said support comprising a plurality of bracket members including a horizontal member, a vertical member, an intermediate member, and means for adjustably securing said intermediate member with respect to each of said first named members.

In testimony whereof I affix my signature.

WILLIAM LAVERY.